March 11, 1924. 1,486,338
W. E. HOKE
METHOD OF MAKING IDENTICAL ARTICLES
Filed Aug. 30, 1918    5 Sheets-Sheet 1
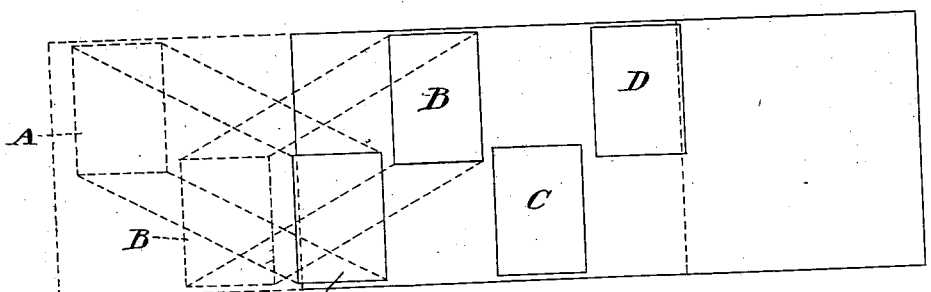
Fig.1.
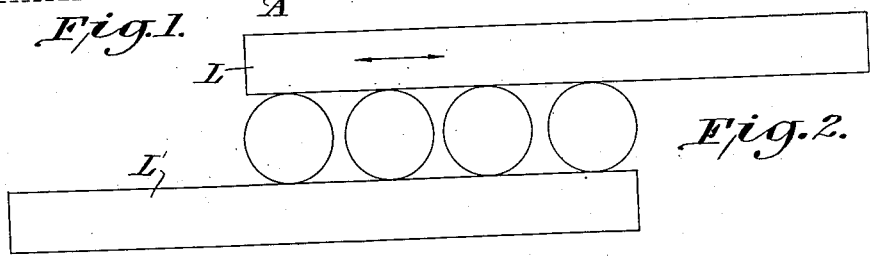
Fig.2.
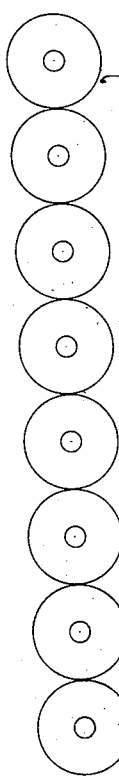
Fig.3.
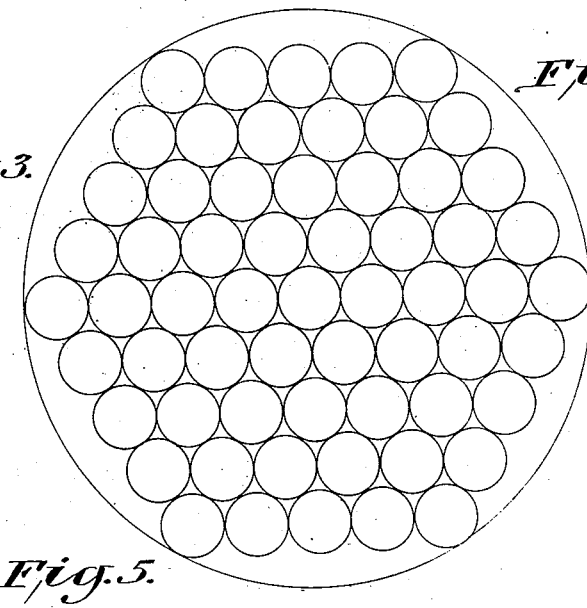
Fig.4.
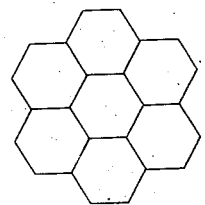
Fig.5.
Fig.6.
Inventor
William E. Hoke
By Byrnes Townsend & Brickenstein
Attorneys March 11, 1924.　　　　　W. E. HOKE　　　　　1,486,338
METHOD OF MAKING IDENTICAL ARTICLES
Filed Aug. 30, 1918　　5 Sheets-Sheet 2
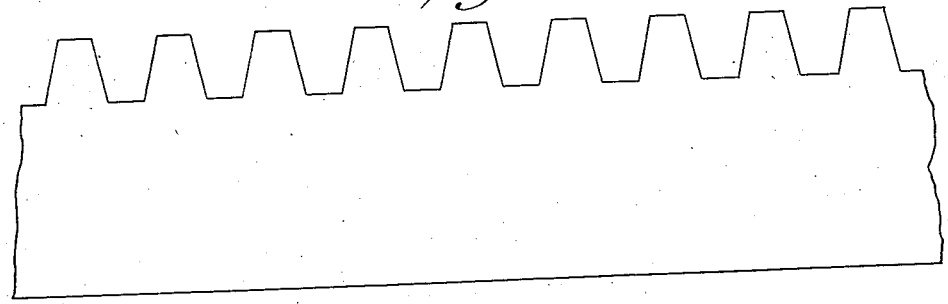
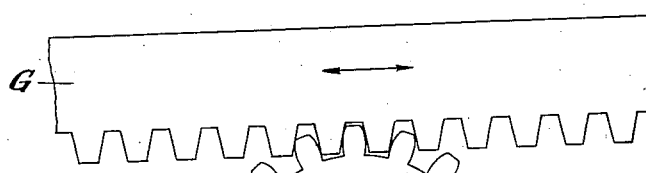
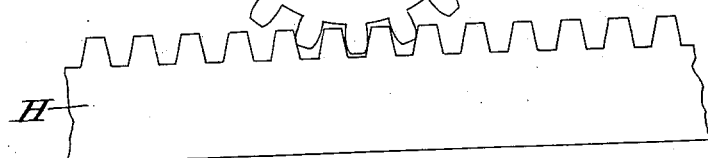
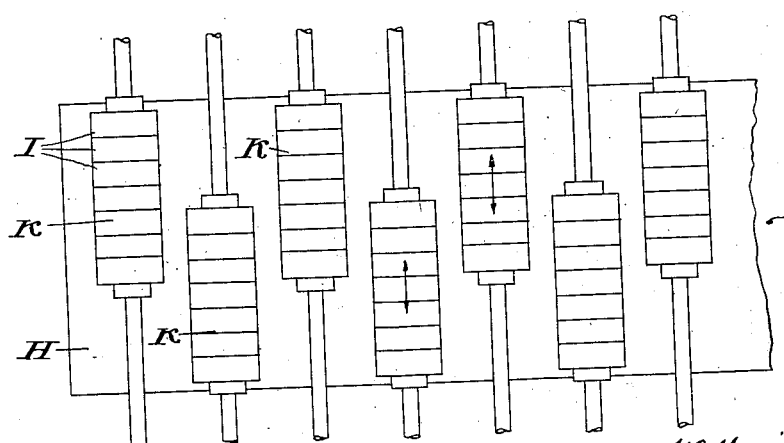
Inventor
William E. Hoke
By Byrnes Townsend & Bickenstein
Attorneys March 11, 1924.
W. E. HOKE
1,486,338
METHOD OF MAKING IDENTICAL ARTICLES
Filed Aug. 30, 1918    5 Sheets-Sheet 3
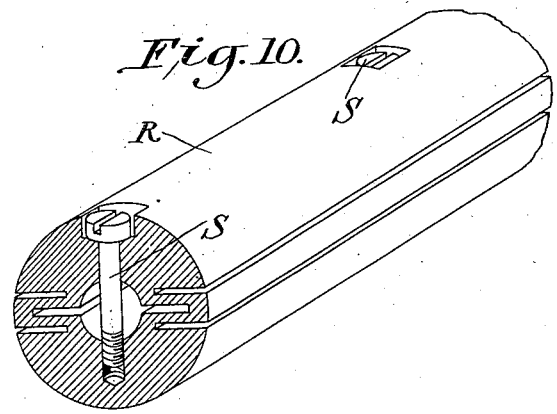
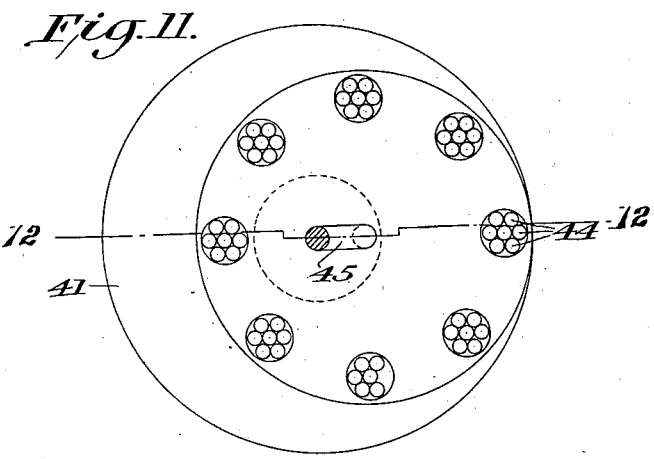
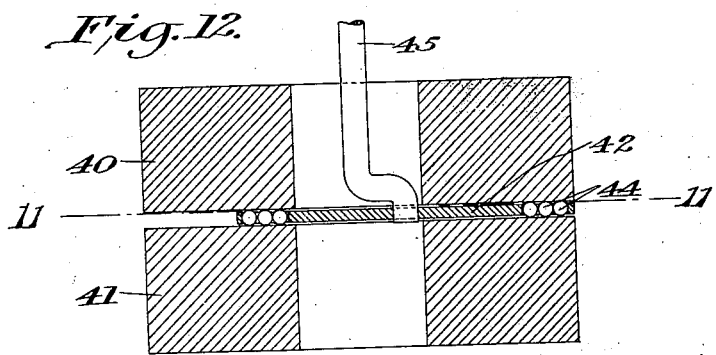
Inventor
William E. Hoke
By Byrnes Townsend & Brickenstein
Attorneys March 11, 1924.

W. E. HOKE 1,486,338

METHOD OF MAKING IDENTICAL ARTICLES

Filed Aug. 30, 1918   5 Sheets-Sheet 4

March 11, 1924.  W. E. HOKE  1,486,338

METHOD OF MAKING IDENTICAL ARTICLES

Filed Aug. 30, 1918   5 Sheets-Sheet 5

Inventor
William E. Hoke
by Byrnes Townsend & Buckmaster
Attorneys

Patented Mar. 11, 1924.

1,486,338

UNITED STATES PATENT OFFICE.

WILLIAM E. HOKE, OF WASHINGTON, DISTRICT OF COLUMBIA.

METHOD OF MAKING IDENTICAL ARTICLES.

Application filed August 30, 1918. Serial No. 252,073.

*To all whom it may concern:*

Be it known that I, WILLIAM E. HOKE, a citizen of the United States, residing at Washington, in the District of Columbia, have invented certain new and useful Improvements in Methods of Making Identical Articles, of which the following is a specification.

This invention relates to a method and apparatus for making articles of various kinds, such as gears, racks, screws, balls, cylindrical rods, perforated articles, etc., of steel or iron in large numbers, each article being of precisely the same dimensions as every other article.

My invention has for its object to produce a multiplicity of articles of precisely identical dimensions.

My invention includes also the step of accurately measuring the length or other dimension of any particular article, by measuring the length or other dimension of a series of such precisely identical articles, in comparison with a standard.

Referring to the drawings,—

Figures 1 and 2 are respectively a diagrammatic plan and end elevation;

Fig. 3 is a diagram of the mode of measuring a series of identical articles;

Figs. 4, 5 and 6 are illustrative plan views of the arrangement of a series of articles while being lapped;

Fig. 7 illustrates a rack.

Fig. 8 is an elevation of a gear-lapping mechanism;

Fig. 9 is a plan of a gear-lapping mechanism;

Fig. 10 is a sectional end view of a mandrel;

Fig. 11 is a plan view on the plane 11—11 of Fig. 12;

Fig. 12 is a section on plane 12—12 of Fig. 11;

Figure 13:
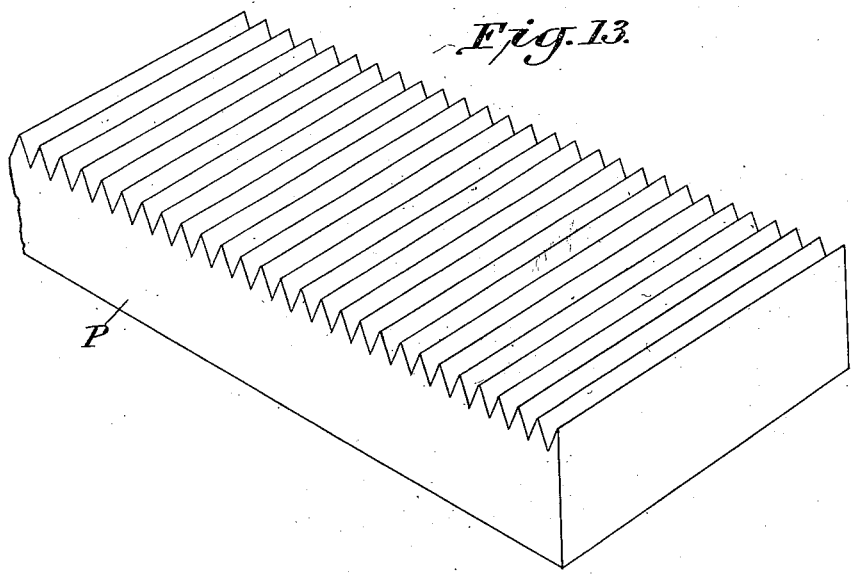
Fig. 13 is a perspective view of a screw-lapping device.

In carrying out my invention, the articles are brought to final shape by lapping with a suitable lap, which consists of a surface of wax, wood, lead, aluminum, copper, iron, or steel having charged into its surface, a suitable abradant, such as emery, alundum, carborundum, etc. I first form what may be termed a series of master laps, such as a series of absolutely plane surfaces. To make such surfaces, three pieces of metal having as nearly as possible plane surfaces, are used. Two of them are rubbed over each other with oil and emery until the two surfaces fit accurately. One of these surfaces is then rubbed over the third until these two surfaces fit accurately. The third surface and the remaining one of the first two surfaces are then rubbed into an accurate fit; and this operation is continued until three accurately fitting surfaces are produced, which must, of necessity, be accurate plane surfaces.

Two of such surfaces are then charged with an abradant and are used in the manner shown in Figs. 1 and 2 to produce a number of identical cylinders. One of these laps L is arranged by any suitable mechanism to reciprocate, while the other L' is mounted on a stationary bed, the blanks A, B, C, D located between the laps, being given an axially reciprocating motion. The resulting path of travel of two of the blanks, A and B is shown in dotted lines. The upper lap rests freely on the surfaces of the blanks, so that the grinding action is unrestrained, and the grinding takes place along the paths of least resistance. As a result of the grinding action between the two accurately plane surfaced laps, the blanks are brought to a more nearly accurate cylindrical form. Blanks A and C are then transposed in position, and turned end for end and the operation repeated. Blanks B and D are then transposed and turned end for end, and the successive operations repeated until an accurately cylindrical shape is obtained. By these successive transpositions and end for end turnings, each of the cylinders is made of exactly the same diameter as every other cylinder. In order to determine the error in diameter of the individual articles, which error may be too small to be discovered by usual means, I place a number of such cylinders side by side, as shown in Fig. 3, and compare their aggregate length with a standard. The difference divided by the number of cylinders gives the exact diameter of each cylinder. For example, if eight cylinders as shown should measure 8.000240 inches in length, then each cylinder would be 1.00003 inches in length, and such measurement, if cylinders exactly an inch in diameter were required, would indicate that a further lapping operation was needed to remove the extra 3/100000th of an inch.

If it is desired to make the ends of the cylinders with plane surfaces exactly at right angles to the axes, a similar method is employed. This method is illustrated in Fig. 4. As there shown, a number of such cylinders, 61 in the particular example shown are placed with their ends on a stationary plane-surface plate and their upper surfaces are lapped with a plane surfaced lapping-plate to which is given free oscillating, curved or reciprocating motion or a combination of all such motions. After the first lapping operation a certain number of the cylinders are transposed in position so that their upper surfaces occupy a different position with reference to the mass of cylinders, the lapping, transposition and rearrangement being repeated until the upper ends of the cylinders are plane and perpendicular to their axes. The same operation is repeated on the other ends of the cylinders, or both ends can be treated simultaneously by lapping between suitable laps. The inevitable result of lapping in this manner is the production of accurately plane-surface ends on each cylinder, these ends being parallel to each other and at right angles to the axis of the cylinder.

The same general method of measurement is employed except that a number of the cylinders are placed end to end and their aggregate length compared with the standard. As each cylinder is of exactly the same length as every other, the length of each cylinder is obtained by dividing their aggregate length by the number of cylinders. In making this measurement, the end of one cylinder is wrung on to the next until all air is excluded from the abutting ends.

This same method involving the use of master laps and production of a multiplicity of precisely identical articles by lapping with repeated transposition and reversal of position may be applied to a great variety of articles.

Thus, hexagonal or square rods may be produced by substantially the same method, except that opposite longitudinal faces of the bars are brought into parallelism by lapping until a multiplicity of such hexagonal or square bars will each fit into or with each other when assembled in a hexagonal or square group, as shown in Figs. 5 and 6.

Obviously any form whatever that is reversibly symmetrical can be produced by the application of these principles of operation.

The same method may be applied to the production of identical precision gears. For this purpose instead of plane surface master laps, I employ accurately identical laps in the form of racks. Such racks, e. g. as shown in Fig. 7 may be produced by first machining or otherwise manufacturing three racks of the desired pitch.

Rack one and rack two are then matched together and moved sidewise either to furnish bearing marks for scraping operations, or with oil and emery to lap them together: the result being that they are fitted into each other accurately by sliding them sidewise and by changing from one tooth to another and turning end to end, until rack one and rack two fit each other with precision. The same operation is then performed between rack one and rack three, the result of which is that rack two and rack three are of identical form but not necessarily of accurate form; but by fitting rack two and rack three together their errors are equalized. This operation is repeated until the three racks will fit each other interchangeably, when they are manifestly precise lapping racks, from which may be generated tooth surfaces on gears of any number of teeth of the same pitch as the generating lap.

In order to form a multiplicity of identical gears, I first form by machining or otherwise, gears I of as nearly as possible accurate form, which gears may be casehardened or otherwise hardened by well-known methods. A number of sets K of gear blanks are each mounted in a stack on a lapping rod, preferably of the form to be described hereafter.

A number of such assemblies or stacks of gear blanks are placed upon the upper surface of the lower lapping rack H over which is placed the upper lapping rack G which rests upon and fits into the teeth of these stacks of gear blanks, the lapping racks being suitably charged or otherwise provided with abradant. The lapping operation is performed by imparting a reciprocating end motion to the upper lapping rack G which causes all of the stacks of gear blanks to rotate and to be ground or lapped by the corrugations in the lapping racks. In order to impart a more active grinding movement than is produced by simply rolling, the various stacks of gear blanks are given a movement from side to side, as indicated in Fig. 9 by arrows, each alternate stack being actuated in opposite direction.

This side to side movement of the stacks of gears is performed simultaneously with the end movement of the upper rack, producing a diagonal grinding or lapping operation on the faces of all of the teeth of each and every one of the gear blanks, and at the same time when a special lapping rod is used, simultaneously laps the center hole through the gear blanks to perfect diameter and roundness. After this lapping operation has proceeded for an interval of time, the upper lap is removed and each alternate gear blank is rotated upon its center axis 180°, and each alternate stack of gear blanks is transposed to a corresponding position at the other end of the lapping rack and is also turned end for end, the purpose being to symmetrically distribute the errors throughout the entire surface of operation. After this has been done, the upper lap is again placed into position and the gear blanks lapped for another interval of time. This interchanging operation is repeated from time to time which results in the generation of gear teeth having theoretically perfect involute, cycloid or other curves, depending upon the character of lapping rack being used. Either spur or spiral gears may thus be made, by using a lapping rack having its teeth at the proper angle.

The final result is to produce identical size in each and every one of the gear blanks and to exactly center the latter.

The method of measuring the gears thus produced is to mesh them into each other in a straight row upon a plane surface and measure the combined length of the whole or a convenient number of them by means of pins accurately fitting the center holes of the two end blanks of the row. For instance, if one-inch gears are being made, and 37 of such gears are placed into mesh side by side upon a plane surface in a row, the center holes of the two end gears should be exactly one yard apart, center to center. In the event that the gears are too large, some one of them will knuckle up or if they are too small there will be back-lash or lost motion when rotated. In the event they are too large they are put back into the machine and again lapped until of the desired size.

The special lapping rods are preferably made as shown in Fig. 10, and may each consist of a cylindrical rod R having a central aperture, on each side of which are cut narrow grooves K¹, K², K³, a series of screws S being located as shown. By setting up or slackening the screw, the effective diameter of the lapping rod may be slightly changed. The rod when properly charged with abradant is then ready for use. When it is desired to lap the central holes simultaneously with the curves of the teeth, the rods are held stationary and the stacks of gears are moved sidewise along the rods and thus have their center holes lapped to perfect diameter and roundness, with their axes exactly normal to the sides of the blank. When it is not desired to lap the center holes, the blanks may be held on the rods against longitudinal movement by any suitable means.

By the method of symmetrically distributing the errors above described, all essential dimensions of the gears are lapped to precise and exact dimensions by a simultaneous operation. If the operation is about completed, it is desirable to have the grain on the face of the teeth run circumferentially so that the sliding movement of the stacks is retarded to a very slow movement while the reciprocating movement of the upper lap is performed at its usual speed, the result being that the faces of the teeth are bright, polished and have the grain running in the direction in which friction occurs when the gears are meshed together for use.

A similar method may be applied to the bringing of steel balls into absolutely identical spherical shape. This method may be practiced by the apparatus shown in Figs. 11 and 12, in which 40 and 41 are annular cylindrical laps having true plane surfaces, the upper lap being arranged in any suitable manner to rotate about its axis. Mounted to be rotated, as by crank 45, eccentrically to the axis of the laps, is a ring 42 having therein a series of circular openings within each of which are retained a number of the balls 44 to be ground. By the eccentric rotation of the plate 42, the balls are rotated and ground between the fixed and rotary lapping surfaces. As before described, the balls are measured after each lapping operation by placing a row of the balls in line, as in a grooved receptacle, and the aggregate length of the row determined by comparison with a standard. If the balls are still too large, they are, after being transposed in their relative positions in the ring openings, subjected to as many successive lapping operations as may be required to reduce them to exact size.

Figure 14:
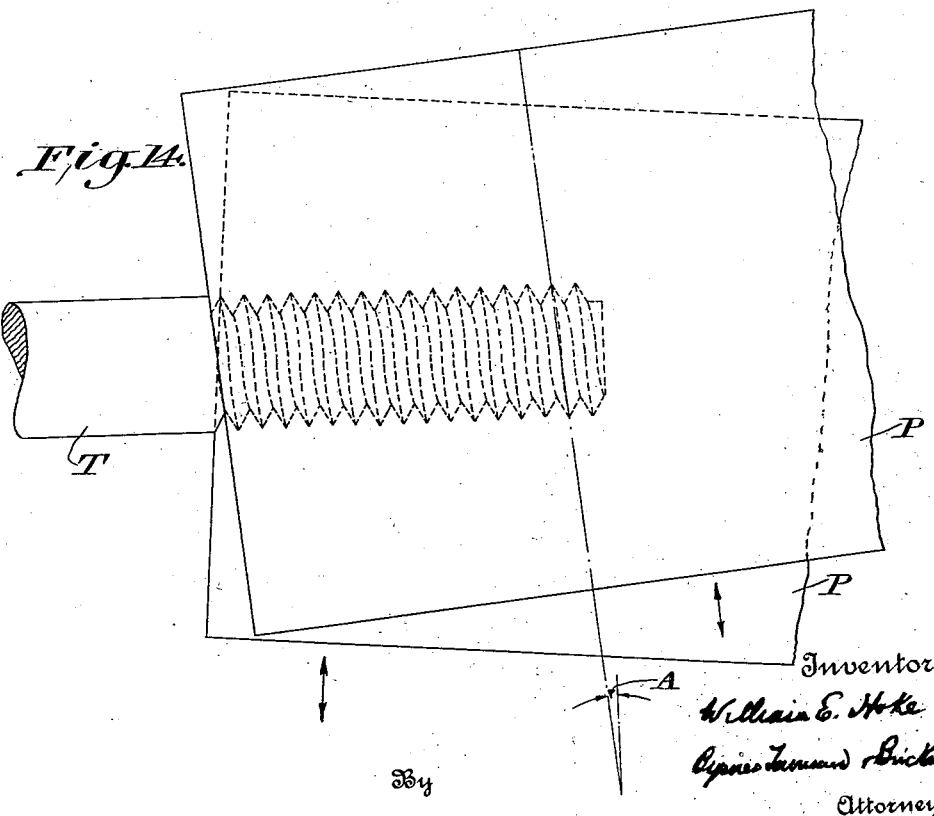
Fig. 14 is a diagrammatic plan of the manner in which devices such as shown in Fig. 13 are used.

By a variation of this method, precision screws may be produced. For this purpose, precision racks P of the form shown in Fig. 13 are first made by the method above described for toothed racks. A screw T whose thread is to be brought to precise dimensions is then made and placed between two of the precision racks charged with abrasive and of the form shown in Fig. 13, but inclined at the proper angle, as shown in Fig. 14.

The thread of the screw will thus be in contact with the teeth of the upper and lower rack on lines located in planes parallel to that passing through the axis of the screw, and by reciprocating the upper and lower racks and rotating the screw, the thread of the screw will be lapped to exact curvature.

By varying the angle of inclination between the line of reciprocation and a line at right angles to the axis of the screw, the lead or pitch of the screw can be altered at will. If the angle A is increased, the lead of the screw is increased. If the angle A is diminished, the lead of the screw is decreased.

It will be noted that in this case there is a constant and automatic transposition of surfaces because of the constant shifting of position, which can be further accentuated by shifting the lapping plates to different positions of the screw under treatment.

Figure 15:
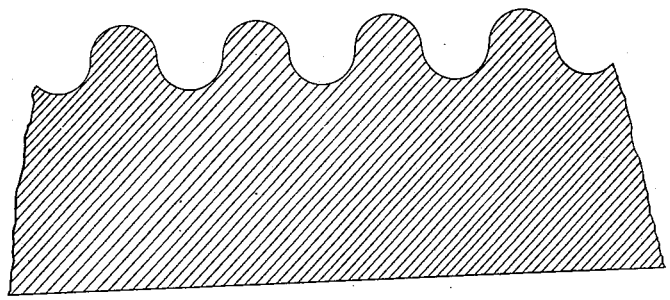
Fig. 15 is a section of a modified form of Fig. 13.

This screw-forming method has been described as applied to V-screw threads, but the same mode of operation is applicable to screws of the well-known U. S. or Whitworth standard shapes or of other shape such as shown in cross-section in Fig. 15.

Figure 16:
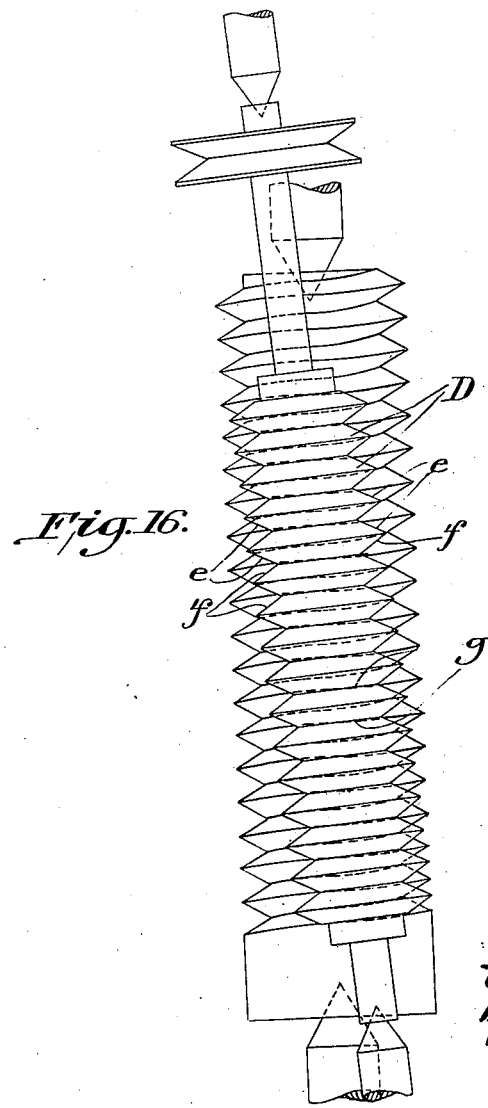
Fig. 16 illustrates, in plan view, still another form of screw-lapping device.

The possibility of making according to my method a large number of identical articles enables the manufacture of screws by still another method as shown in Fig. 16. In this method I produce a series of identical disks D having the surfaces, $e, e,$—$f, f,$—$g, g$, in parallelism. A series of such disks when properly charged with abrasive and mounted on a rotary shaft $i$, arranged at a suitable angle to a screw blank mounted to permit of reciprocation, will lap the screw surface of the blank to exact and precise form, and by altering the inclination of the axis of the lap to the axis of the screw, the pitch of the thread may be varied at will.

In none of the lapping operations which have been described, is the lapping surface confined to restrain in its grinding action. The lap, which may, of course, be weighted if desired is allowed to rest upon the surface of the multiplicity of articles and thus acts only to remove upstanding inequalities wherever they occur in the whole group of articles. Laps having this unrestrained movement, are thus free to adapt themselves to the surfaces being lapped, and may be designated as "floating laps." By the repeated transposition and interchange, such inequalities are gradually removed, until all the separate surfaces, no matter how much they are interchanged, are brought into final register or accord. The articles or blanks themselves are thus the guide for the lap.

In other words, the surface made up of the surfaces of all the articles has inequalities, and because of the possibility of interchanging and transposition of the component parts of this aggregate surface, I can and do utilize the blanks themselves as gauges for determining the point when exact similarity is reached.

While I have described certain methods of transposition of the articles being worked upon, many other methods may be followed, depending upon the article being made. Thus, in the manufacture of gears as above described, it is desirable, particularly when the centre holes are being lapped simultaneously with the lapping of the teeth surfaces, to transpose each alternate gear in the stack face for face, as well as to transpose the gears in their relative position in the stack and to rotate them on their axes to a different angular position.

As the opposite faces of the gears or their hubs have previously been brought into exact parallelism by the method, as described in connection with Fig. 4, the holes in the gears will all be of the same size and at right angles to the side faces.

In fact, this mode of procedure is applicable to the production of a series of articles having a series of identically sized and spaced holes, the holes in a stack of such articles being subjected to repeated lappings with intermediate changes of their relative position in the stack and such other transpositions as have been above indicated for gears.

In the above described lapping operations, the weight of the upper lap rests upon and is supported by the work being operated upon. For rapid manufacture support stops may be used to limit the downward movement of the upper lap by supporting its weight and thereby preventing further grinding action upon the work.

Where great exactness is essential, it is necessary to have equal temperatures throughout all parts of the machine. This is accomplished by submerging the entire lapping device in a cooling liquid.

The terms "lap" and "lapping" are intended to include not only abrading with surfaces charged with abrasive, but also other abrading action.

I claim:

1. The method of making a multiplicity of identical articles which consists in simultaneously lapping a multiplicity of blanks, systematically interchanging the relative position of the blanks, and repeating the lapping until all and each of the articles are brought to the identical dimensions.

2. The method of bringing the surfaces of articles into accurate final form and relation which consists in simultaneously abrading the surface portions of such articles, in a group, by relative movement thereof in relation to a movable unrestrained suitably shaped abrasive surface, interchanging the relative positions of the surfaces being ground and continuing the abrading with repeated interchange of position until the final form and relation are obtained.

3. The herein described method of making a multiplicity of identical articles, the method consisting in providing a plurality of similar but not necessarily identical blanks, in arranging the blanks in a group between two laps at least one of which is free to adapt itself in accordance with variations in the sizes of the blanks, in causing relative movement between the laps and the blanks to effect lapping, in then transferring the positions of some of the blanks in the group so that blanks of different size or shape are to some extent interlarded or interchanged, and in repeating the lapping and transferring alternately until identical sizes are attained.

4. The method of making a multiplicity of identical articles which consists in subjecting a number of blanks of varying dimensions to lapping between a stationary lap and a second lap free to adapt itself to the surfaces being lapped, interchanging the relative positions of the blanks with reference to each other and to the lapping tools, and repeating the lapping until all and each of the articles are brought to the same dimensions.

5. The method as claimed in claim 2 in which a multiplicity of separate articles each having an identical dimension is produced, and the dimension of each article is ascertained by placing a number of the articles in contact with each other in a straight row and comparing their aggregate length with a standard.

6. The method as claimed in claim 5 in which the articles are successively brought to have an identical dimension and measured, these actions being repeated until the articles are each brought to have the exact dimension required.

7. The method as claimed in claim 1 in which a multiplicity of separate articles each having an identical dimension is produced, and the dimension of each article is ascertained by placing a number of the articles in contact with each other in a straight row and comparing their aggregate length with a standard.

8. The method as claimed in claim 7 in which the articles are successively brought to have an identical dimension and measured, these actions being repeated until the articles are each brought to have the exact dimension required.

9. The method of making a number of similar articles with predetermined identical sizes, which consists in subjecting the articles to a reducing operation whereby they are formed with identical sizes greater than the predetermined size, stopping the reducing operation and placing the articles together in a straight row, comparing the total length of the row of articles with a known standard having a length equal to the sum of the predetermined identical sizes and observing the excess, again subjecting the articles to the reducing operation, and repeating the reducing and comparing operations alternately until the total length of the row exactly equals that of the standard.

In testimony whereof I affix my signature.

WILLIAM E. HOKE.